US012597382B2

(12) United States Patent
Huang et al.

(10) Patent No.: US 12,597,382 B2
(45) Date of Patent: Apr. 7, 2026

(54) DISPLAY DEVICE HAVING LIGHT SENSING FUNCTION AND PIXEL CIRCUIT DRIVING METHOD

(71) Applicant: AUO Corporation, Hsinchu City (TW)

(72) Inventors: Yu-Chien Huang, Hsinchu City (TW); Yung-Hsiang Lan, Hsinchu City (TW); Yung-Chih Chen, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 4 days.

(21) Appl. No.: 18/946,988

(22) Filed: Nov. 14, 2024

(65) Prior Publication Data

US 2025/0322780 A1 Oct. 16, 2025

(30) Foreign Application Priority Data

Apr. 12, 2024 (TW) ................................ 113113845

(51) Int. Cl.
*G09G 3/32* (2016.01)

(52) U.S. Cl.
CPC ....... *G09G 3/32* (2013.01); *G09G 2300/0842* (2013.01); *G09G 2320/0626* (2013.01); *G09G 2360/144* (2013.01)

(58) Field of Classification Search
CPC ...... G09G 3/32-3291; G09G 2300/0421-043; G09G 2300/0809;

(Continued)

(56) References Cited

U.S. PATENT DOCUMENTS

2004/0227706 A1 11/2004 Sung
2015/0348504 A1* 12/2015 Sakariya .............. G09G 3/2092 345/82
2025/0029566 A1* 1/2025 Kim ..................... G09G 3/3291

FOREIGN PATENT DOCUMENTS

TW 200425027 A 11/2004
TW I718776 B 2/2021
TW I857677 B 10/2024

OTHER PUBLICATIONS

Eiichi Miyazaki et al., "Using a light-emitting diode as a high-speed, wavelength selective photodetector", Review of Scientific Instruments, vol. 69, No. 11, Nov. 1998, p. 3751-3754.

* cited by examiner

*Primary Examiner* — Nathan Danielsen
(74) *Attorney, Agent, or Firm* — WPAT, PC

(57) ABSTRACT

A pixel circuit driving method for driving a pixel circuit having light sensing function is provided. The pixel circuit includes a light emitting element and a switching circuit electrically connected to the light emitting element. The pixel circuit driving method includes performing light emitting and light sensing steps. The light emitting step includes providing a lighting emitting control signal for the pixel circuit to control the light emitting element to emit light during a light emitting period. The light sensing step includes turning on the switching circuit and providing a reference potential to the light emitting element, in which the reference potential is lower than a cathode potential of the light emitting element. A reverse current proportional to light intensity based on a difference between the reference potential and the cathode potential is generated; and brightness of the light emitting element based on the reverse current is adjusted.

14 Claims, 11 Drawing Sheets

(58) Field of Classification Search
CPC ... G09G 2300/0819; G09G 2300/0842; G09G 2310/0243–0251; G09G 2310/06; G09G 2310/08; G09G 2320/0233; G09G 2320/0242; G09G 2320/04; G09G 2320/0626; G09G 2360/14; G09G 2360/144–148
See application file for complete search history.

DISPLAY DEVICE HAVING LIGHT SENSING FUNCTION AND PIXEL CIRCUIT DRIVING METHOD

RELATED APPLICATIONS

This application claims priority to Taiwan Application Serial Number 113113845, filed Apr. 12, 2024, which is herein incorporated by reference.

BACKGROUND

Technical Field

The present disclosure relates to a display device and a pixel circuit driving method, and more particularly to a display device and a pixel circuit driving method having a light sensing function.

Description of Prior Art

Micro light emitting diode (μLED) has the advantages of high brightness, high reliability, and low power consumption, and has been widely used in automotive display systems, wearable devices, and various display screens. Typically, the pixel circuits used to drive the μLEDs are first subjected to an array detection before the μLEDs are massively transferred to a target substrate, and then the array detection circuits are either removed from the target substrate or left on the target substrate without being used for any purpose.

Furthermore, the high light reflectivity of an indium bump, which is a structure used for electrical connection between the μLEDs and related circuits, results in a black organic material being used in current μLED products to minimize the light reflectivity. As a result, although the problem of high light reflectivity is solved, the ambient light sensor in the display device is blocked by the black organic material, resulting in a decrease in a penetration rate of ambient light or even an inability to detect changes in ambient light.

SUMMARY

Accordingly, the present disclosure provides a pixel circuit driving method for driving a first pixel circuit having a light sensing function. The first pixel circuit includes a light emitting element and a switching circuit electrically connected to an anode terminal of the light emitting element. The pixel circuit driving method includes performing a light emitting step and performing a light sensing step. Performing the light emitting step includes providing a light emitting control signal for the first pixel circuit to control the light emitting element to emit light during a light emitting period of the light emitting control signal. Performing the light sensing step includes turning on the switching circuit electrically connected to the anode terminal of the light emitting element and providing a reference potential to the light emitting element through the switching circuit, in which the reference potential is lower than a cathode potential of a cathode terminal of the light emitting element, and the light emitting element generates a reverse current proportional to light intensity based on a difference between the reference potential and the cathode potential; and adjusting a brightness of the light emitting element based on the reverse current.

According to one embodiment of the present disclosure, a period during which the light sensing step is performed does not overlap with the light emitting period of the light emitting control signal.

According to one embodiment of the present disclosure, before the light emitting element is electrically connected to the first pixel circuit, the pixel circuit driving method further includes performing a detection step. Performing the detection step includes providing at least one scanning signal, at least one reference signal, the light emitting control signal, and an image data to the first pixel circuit for generating a detection driving current to the switching circuit; and turning on the switching circuit to transmit the detection driving current to a control circuit for determining whether the first pixel circuit is abnormal based on the detection driving current.

According to one embodiment of the present disclosure, the first pixel circuit further includes a light emitting element driving circuit, and the light emitting element driving circuit includes at least one storage capacitor and several transistors, the detection step further includes detecting whether each of the at least one storage capacitor and the transistors is abnormal.

According to one embodiment of the present disclosure, the first pixel circuit is disposed on a display panel, and the display panel further includes several second pixel circuits, and the step of adjusting the brightness of the light emitting element based on the reverse current further includes collecting the reverse current of each of the second pixel circuits on the display panel; and generating a light sensing modulation signal to the second pixel circuits to adjust the brightness of the light emitting element based on the reverse current of each of the second pixel circuits.

According to one embodiment of the present disclosure, the switching circuit includes a P-type transistor.

According to one embodiment of the present disclosure, the switching circuit includes an N-type transistor.

According to one embodiment of the present disclosure, a display device having a light sensing function including a plurality of pixel circuits is provided. Each of the pixel circuits includes a light emitting element, a light emitting element driving circuit, and a switching circuit. The light emitting element has an anode terminal and a cathode terminal. The light emitting element driving circuit is electrically connected to the light emitting element for driving the light emitting element to emit light during a light emitting period of the light emitting control signal based on the light emitting control signal. The switching circuit is electrically connected between the anode terminal of the light emitting element and a reference potential, in which the reference potential is lower than a cathode potential of the cathode terminal of the light emitting element. The light emitting element generates a reverse current proportional to light intensity based on a difference between the reference potential and the cathode potential in response to the switching circuit being turned on, and the light emitting element driving circuit adjusts a brightness emitted by the light emitting element based on the reverse current.

According to one embodiment of the present disclosure, an on period of the switching circuit does not overlap with the light emitting period of the light emitting control signal.

According to one embodiment of the present disclosure, the display device further includes a photocurrent collection circuit. The photocurrent collection circuit is electrically connected to the pixel circuits and configured to collect the reverse current sensed by each of the pixel circuits.

According to one embodiment of the present disclosure, the display device further includes a control circuit. The control circuit is electrically connected to the photocurrent collection circuit and is configured to generate a light sensing modulation signal based on the reverse current sensed by the pixel circuits and adjust the brightness of the light emitting element based on the light sensing modulation signal.

According to one embodiment of the present disclosure, the switching circuit is further used as an array detection circuit for detecting corresponding one of the pixel circuits before the light emitting element is electrically connected to each of the pixel circuits.

According to one embodiment of the present disclosure, the light emitting element driving circuit includes at least one storage capacitor and several transistors.

BRIEF DESCRIPTION OF THE DRAWINGS

For a clearer and easier understanding of the above and other objects, features, advantages, and embodiments of the present disclosure, the drawings are described below.

DETAILED DESCRIPTION

Figure 1:
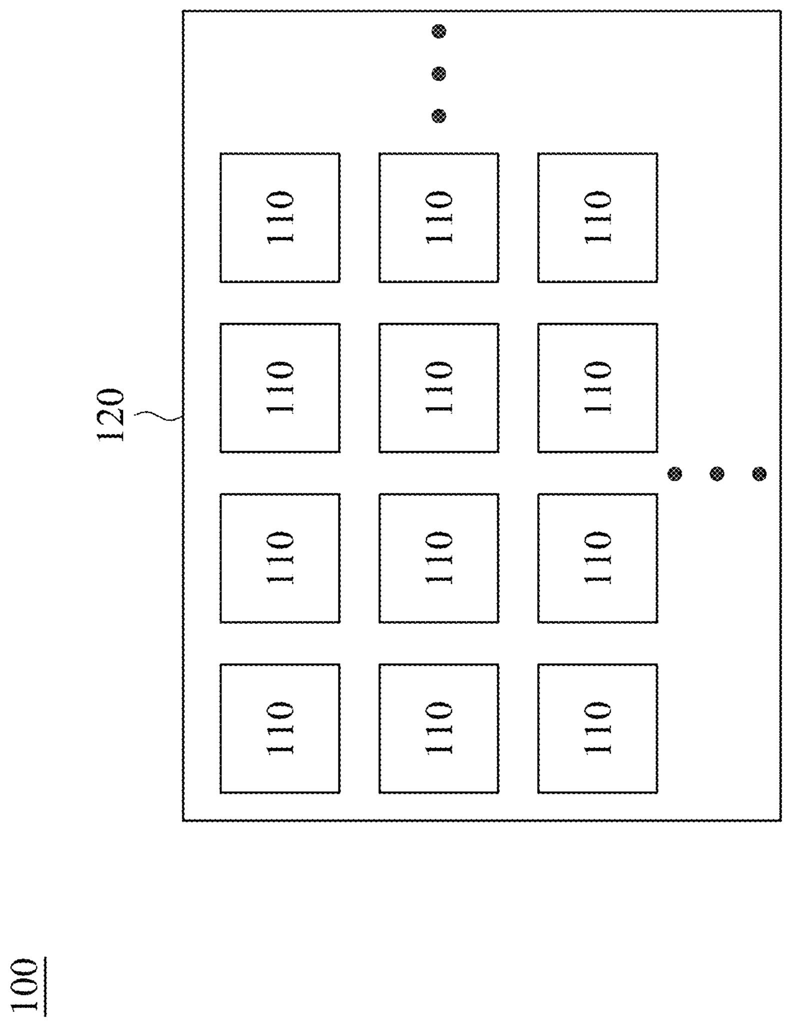
FIG. 1 is a schematic diagram of a display device having a light sensing function according to an embodiment of the present disclosure.

Various different embodiments or examples are provided below for implementing different features of the provided disclosure. The embodiments of components and configurations described below are examples only and are not intended to be restrictive. In addition, for the purpose of simplification and clarity, the present disclosure repeats reference numerals and/or numbers in each example in the present disclosure, and this repetition does not in itself limit the relationship between various embodiments and/or components discussed.

Referring to FIG. 1, FIG. 1 is a schematic diagram of a display device 100 having a light sensing function according to an embodiment of the present disclosure. The display device 100 having the light sensing function includes several pixel circuits 110, and these pixel circuits 110 are disposed on the display panel 120. A number, layout and arrangement of the pixel circuits 110 on the display panel 120 may be varied as desired, and the present disclosure is not limited thereto.

Figure 2:
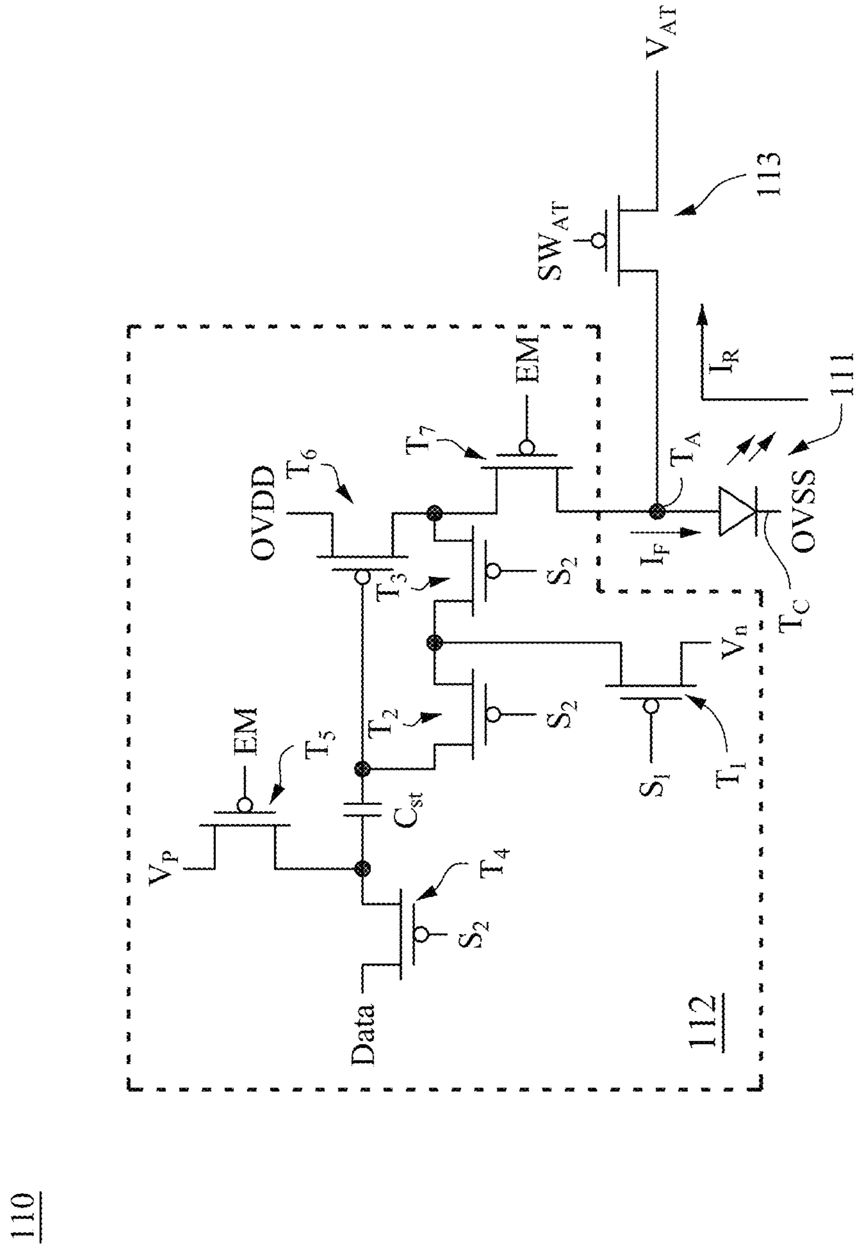
FIG. 2 is a schematic diagram of a pixel circuit according to an embodiment of the present disclosure.

Referring to FIG. 2, FIG. 2 is a schematic diagram of a pixel circuit 110 according to an embodiment of the present disclosure. Each of the pixel circuits 110 includes a light emitting element 111, a light emitting element driving circuit 112, and a switching circuit 113.

The light emitting element 111 includes an anode terminal $T_A$ and a cathode terminal $T_C$, and in the embodiment of the present disclosure, the light emitting element 111 is a micro light emitting diode (μLED).

The light emitting element driving circuit 112 electrically connects the light emitting element 111 to drive the light emitting element 111 to emit light during an light emitting period of the light emitting control signal EM based on the light emitting control signal EM (in the case of the example of FIG. 2, the transistor $T_7$ is a P-type transistor, and thus the light emitting period is a period during which the light emitting control signal EM is at a low logic level).

The switching circuit 113 is electrically connected between the anode terminal $T_A$ of the light emitting element 111 and a reference potential $V_{AT}$, and is configured to be turned on or off based on the control signal $SW_{AT}$, in which the reference potential $V_{AT}$ is lower than a cathode potential OVSS of the cathode terminal $T_C$ of the light emitting element 111. When the control signal $SW_{AT}$ provides an off signal (e.g., a high logic level), the switching circuit 113 is turned off, and the reference potential $V_{AT}$ cannot be transmitted to the anode terminal $T_A$ of the light emitting element 111.

Conversely, when the control signal $SW_{AT}$ provides an on signal (e.g., a low logic level), the switching circuit 113 is turned on so that the reference potential $V_{AT}$ is transmitted to the anode terminal $T_A$ of the light emitting element 111 and a reverse bias voltage ($V_{AT}$−OVSS<0) is formed between the anode terminal $T_A$ and the cathode terminal $T_C$ of the light emitting element 111, thereby generating a reverse current $I_R$ proportional to the light intensity. Therefore, the brightness of the light emitting element 111 can be further adjusted by calculating the current ambient light intensity based on a magnitude of the reverse current $I_R$, and the function of adjusting the display brightness based on the sensed light of the display device 100 having the light sensing function can be realized.

In addition, although the switching circuit 113 shown in FIG. 2 is a P-type transistor, the switching circuit 113 may also be an N-type transistor or any electronic device that can realize the switching function, etc., and the present disclosure is not limited thereto. It should also be appreciated that although the switching circuit 113 depicts only a P-type transistor, the switching circuit 113 may in fact include other electronic components.

Figure 3A:
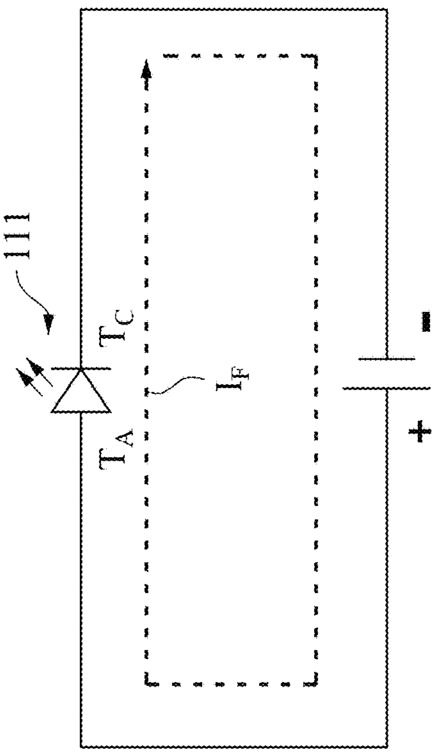
FIG. 3A is a schematic diagram of a characteristic of a light emitting element in a forward bias mode according to an embodiment of the present disclosure.
Figure 3B:
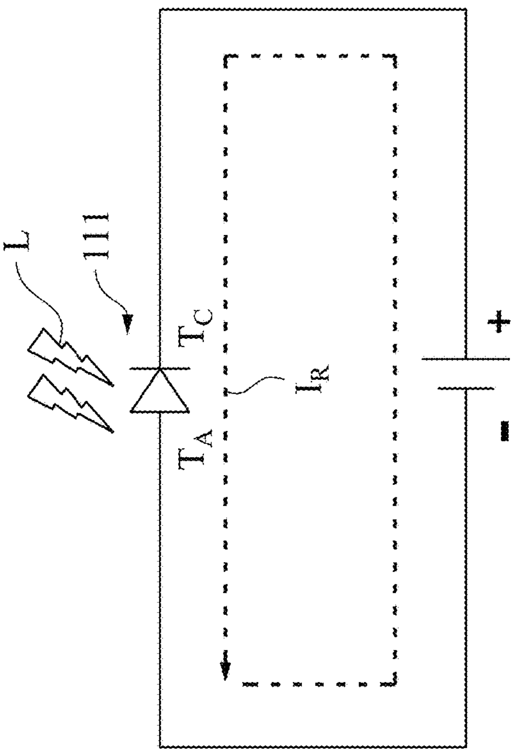
FIG. 3B is a schematic diagram of a characteristic of a light emitting element in a reverse bias mode according to an embodiment of the present disclosure.

FIGS. 3A and 3B are schematic diagrams of characteristics of the light emitting element 111 in a forward bias mode and a reverse bias mode, respectively, according to embodiments of the present disclosure.

As shown in FIG. 3A, the forward bias mode represents a positive voltage across at both terminals of the light emitting element 111, i.e., a positive (+) terminal of a voltage is electrically connected to the anode terminal $T_A$ of the light emitting element 111, while a negative (−) terminal of the voltage is electrically connected to the cathode terminal $T_C$ of the light emitting element 111. In the forward bias mode, the light emitting element 111 emits a corresponding brightness based on the forward current $I_F$. When the forward current $I_F$ flowing through the light emitting element 111 is larger, the light emitting element 111 becomes brighter. Conversely, when the forward current $I_F$ flowing through the light emitting element 111 is smaller, the light emitting element 111 becomes darker.

As shown in FIG. 3B, the reverse bias mode represents a negative voltage across at both terminals of the light emitting element 111, i.e., a positive (+) terminal of a voltage is electrically connected to the cathode terminal $T_C$ of the light emitting element 111, while a negative (−) terminal of the voltage is electrically connected to the anode terminal $T_A$ of the light emitting element 111. In the reverse bias mode, if the light emitting element 111 is irradiated by a light L, a reverse current $I_R$ proportional to the intensity of the light L is generated. When the intensity of the light L sensed by the light emitting element 111 is stronger, a larger reverse current $I_R$ is generated. Conversely, when the intensity of the light L sensed by the light emitting element 111 is weaker, a smaller reverse current $I_R$ is generated.

It is worth noting that red (R), green (G), and blue (B) micro light emitting diodes (the light emitting element 111) all have the property that the reverse current $I_R$ is proportional to the intensity of the light L. Therefore, based on this characteristic of the light emitting element 111, the present disclosure realizes both the light sensing function and the light emitting function in each pixel circuit 110 by controlling the voltage across (forward bias or reverse bias) at both terminals of the light emitting element 111.

Referring back to FIG. 2, in the embodiment of the disclosure, the light emitting element driving circuit 112 includes a storage capacitor $C_{st}$ and several transistors $T_1$ to $T_7$. The transistor $T_6$ and the transistor $T_7$ are driving transistors used to determine a magnitude of the forward current $I_F$ flowing through the light emitting element 111, which further determines the brightness generated by the light emitting element 111. It should be understood that the light emitting element driving circuit 112 illustrated in FIG. 2 is only an example, and in fact the light emitting element driving circuit 112 may include a greater or lesser number of storage capacitors $C_{st}$ and transistors, and these storage capacitors $C_{st}$ and transistors may also have other connection structures and layouts. For example, the light emitting element driving circuit 112 may be a common 2T1C (two transistors and a storage capacitor) or 6T1C (six transistors and a storage capacitor) structure, and the present disclosure is not limited thereto.

In addition, since the operation of the storage capacitor $C_{st}$ and transistors $T_1$ to $T_7$ in the light emitting element driving circuit 112 is not the focus of the present disclosure, and since a person skilled in the art should be able to understand the operations of the reset of a driving gate, the compensation of a critical voltage, the writing of an image data, and the light emitting of the light emitting element 111 from the structure of the light emitting element driving circuit 112, and the details will not described hereinafter.

Figure 4:
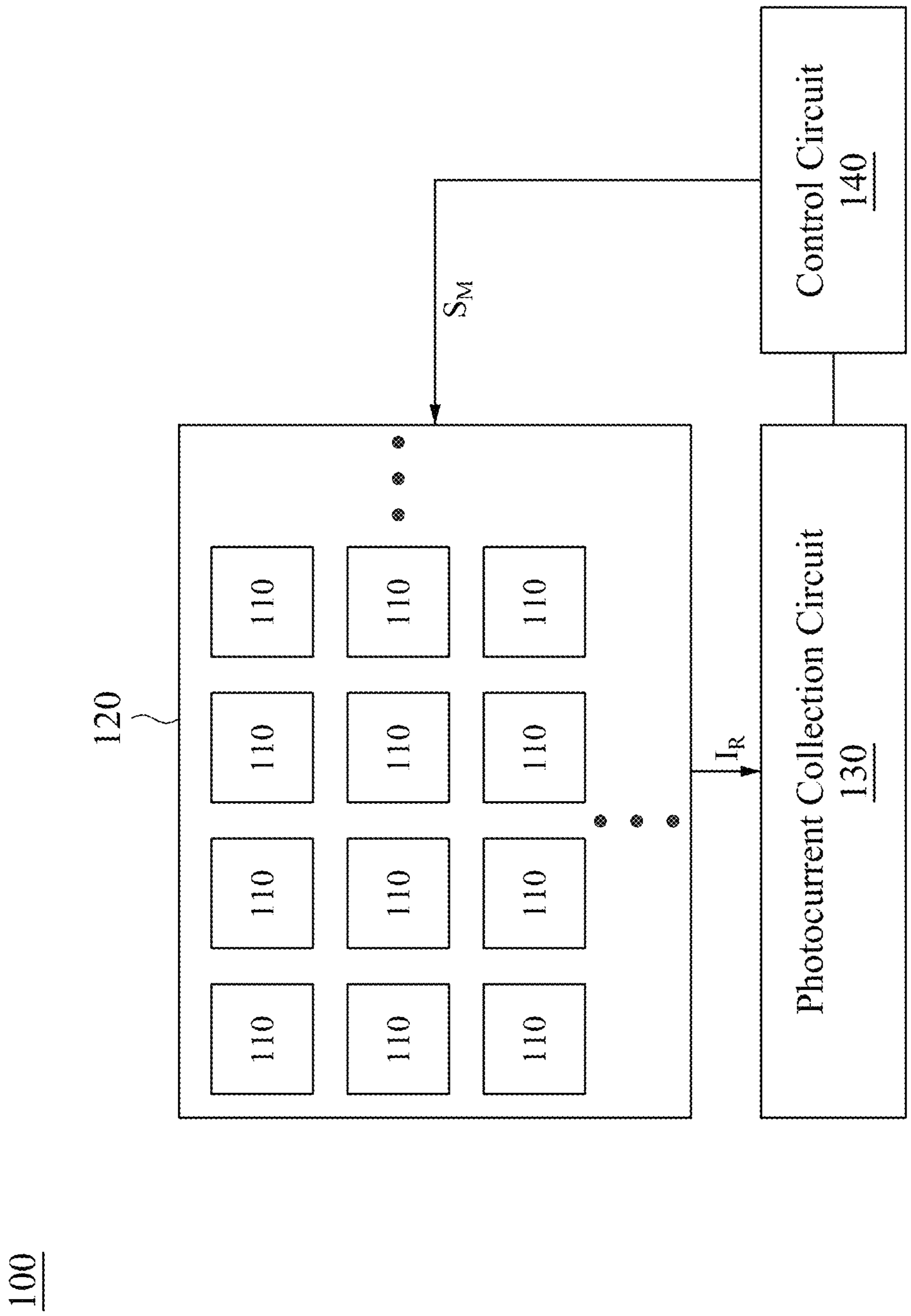
FIG. 4 is a schematic diagram of a display device having a light sensing function including a photocurrent collection circuit and a control circuit according to an embodiment of the present disclosure.

Referring to FIG. 4, the display device 100 having the light sensing function also includes a photocurrent collection circuit 130 and a control circuit 140. The photocurrent collection circuit 130 is electrically connected to pixel circuits 110 on the display panel 120 and is configured to receive the reverse current $I_R$ sensed by these pixel circuits 110. The control circuit 140 is electrically connected to the photocurrent collection circuit 130 and is configured to generate a light sensing modulation signal Sm based on the reverse current $I_R$ sensed by the pixel circuits 110, and then adjust the brightness of the light emitting elements 111 in the pixel circuits 110 based on the light sensing modulation signal SM. In some embodiments, the photocurrent collection circuit 130 and the control circuit 140 may be integrated into a single integrated circuit or included in a common control integrated circuit of display devices, and the present disclosure is not limited thereto.

Referring to FIGS. 2 and 4, specifically, an on period of the switching circuit 113 does not overlap with the light emitting period (e.g., during the period of a low logic level) of the light emitting control signal EM. That is, when the light emitting element 111 of the pixel circuit 110 emits light, the switching circuit 113 is turned off, and only when the light emitting element 111 not emit light, the switching circuit 113 may be turned on to cause the light emitting element 111 to sense light. Accordingly, the reverse current $I_R$ collected by the photocurrent collection circuit 130 does not include the reverse current $I_R$ of each of the pixel circuits 110 on the entire display panel 120, in fact, each of the pixel circuits 110 (or the pixel circuits 110 in each column) may be controlled to selectively emit light or sense light. Therefore, the reverse currents $I_R$ collected by the photocurrent collection circuit 130 are the reverse current(s) $I_R$ of the pixel circuit(s) 110 currently selected for light sensing.

When multiple pixel circuits 110 are used simultaneously for light sensing, a larger reverse current $I_R$ can be sensed compared to using a single pixel circuit 110, which improves the signal-to-noise ratio (SNR) of the reverse current $I_R$ and makes it less susceptible to noise from the photocurrent collection circuit 130 or the control circuit 140.

Referring to FIGS. 5A to 5F, FIGS. 5A to 5F are schematic diagrams of controlling different numbers of light sensing columns and light emitting columns according to embodiments of the present disclosure. FIGS. 5A to 5F illustrate columns $C_1$ to $C_n$, where each column includes multiple pixel circuits 110 (not shown). It should be understood that FIGS. 5A to 5F are merely exemplary embodiments, in fact, the control methods for controlling the number of light sensing columns and light emitting columns may be adjusted or modified as needed, and the present disclosure is not limited thereto.

Figure 5B:
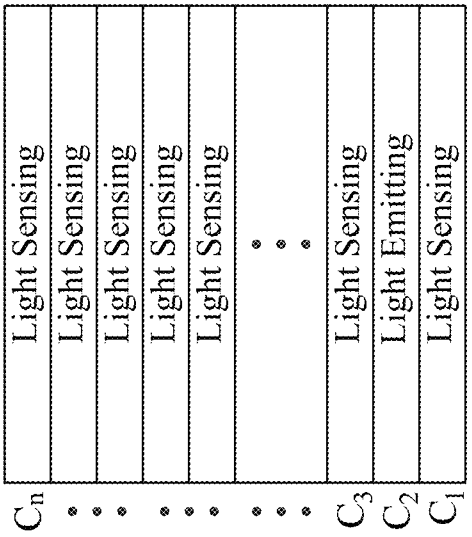
FIGS. 5A to 5F are schematic diagrams of controlling different numbers of light sensing columns and light emitting columns according to embodiments of the present disclosure.
Figure 5A:
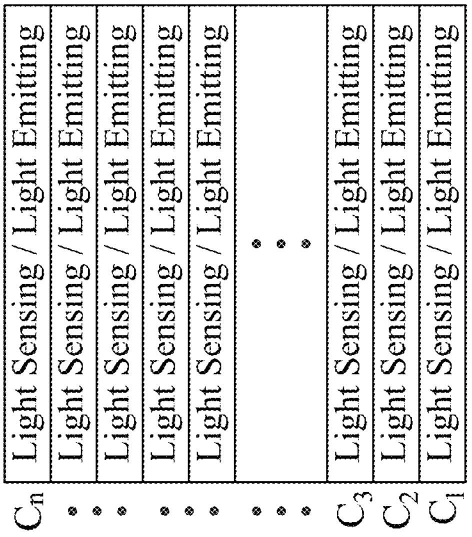

In the control method of FIG. 5A, as long as the pixel circuits 110 in each column are not used to emit light, they are used to sense light.

In the control method of FIG. 5B, the pixel circuits 110 in one column (for example, column $C_2$) are used to emit light, while the pixel circuits 110 in the other columns are used to sense light.

Figure 5D:
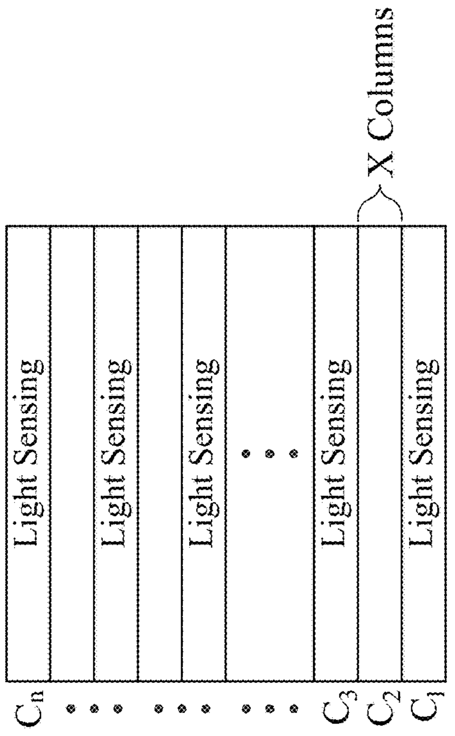
Figure 5C:
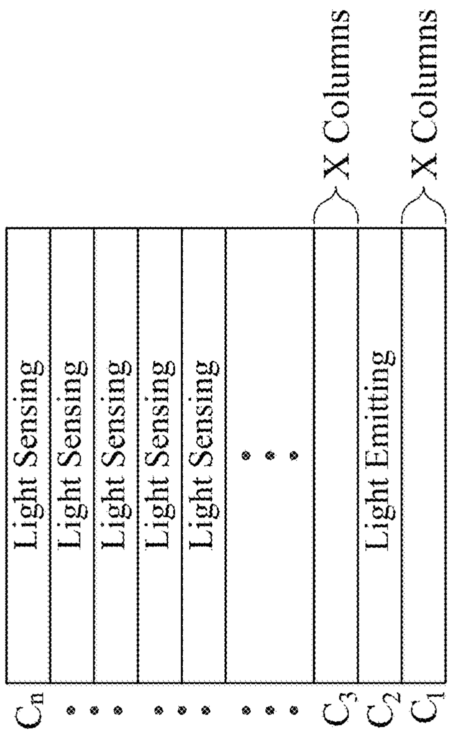

In the control method of FIG. 5C, the pixel circuits 110 in the other columns are used to sense light, except for the pixel circuits 110 in one of the columns (e.g., column $C_2$) that are used to emit light and their adjacent X columns that are not specifically active (may be used to emit light, sense light, or be inactive).

In the control method of FIG. 5D, the pixel circuits 110 in each X columns act as the light sensors, and the pixel circuits 110 in the other columns are not specifically active (may be used to emit light or inactive), so that there are n/X columns of pixel circuits 110 in light sensing at the same time.

Figure 5F:
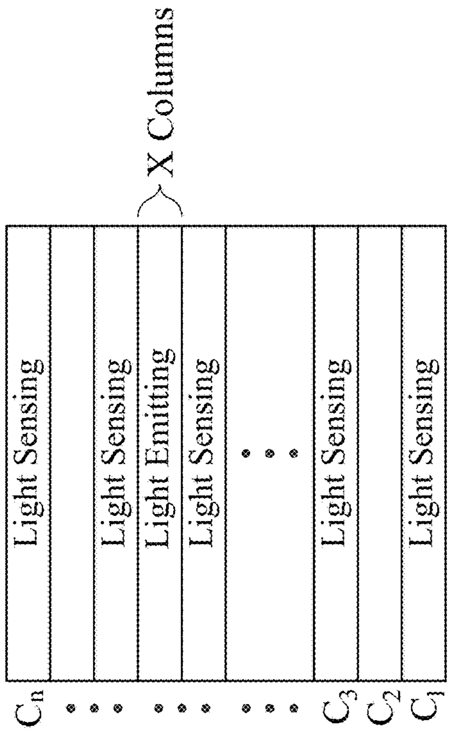
Figure 5E:
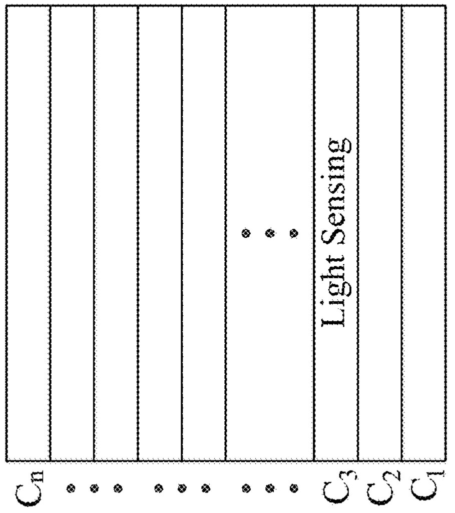

In the control method of FIG. 5E, at the same time point, only the pixel circuits 110 in one column act as the light sensors, while the pixel circuits 110 in the other columns are not specifically active (may be used to emit light, or be inactive). At the next time point, the pixel circuits 110 in the next column act as the light sensors, and so on, alternating light sensing column by column.

In the control method of FIG. 5F, the pixel circuits 110 in X columns are fixed to emit light, and the pixel circuits 110 in the other columns may be interleaved for light sensing or inactive.

It should be understood that although the control methods of FIGS. 5A to 5F are disclosure herein, as long as the light sensing period (i.e., the on period of the switching circuit 113) does not overlap with the light emitting period of the light emitting control signal EM, any other control methods are within the scope of the present disclosure.

In summary, the pixel circuit 110 realizes the functions of light emitting and light sensing in a single circuit according to the light emitting element 111. When the pixel circuit 110 is light emitting, the light emitting element 111 emits corresponding brightness based on the image data (Data) and the forward current $I_F$. When the pixel circuit 110 is light sensing, the light emitting element 111 generates the corresponding reverse current $I_R$ based on the intensity of the ambient light L. As a result, the control circuit 140 can further extrapolate the intensity of the ambient light L to dim or brighten the brightness of the light emitting element 111. For example, when the ambient light L is too strong, the reverse current $I_R$ sensed by the light emitting element 111 is larger, and the brightness of the light emitting element 111 can be brightened by referring to the reverse current $I_R$. Conversely, when the ambient light L is too dark, the reverse current $I_R$ sensed by the light emitting element 111 is smaller, and the brightness of the light emitting element 111 can be dimmed by referring to the reverse current $I_R$.

Figure 6:
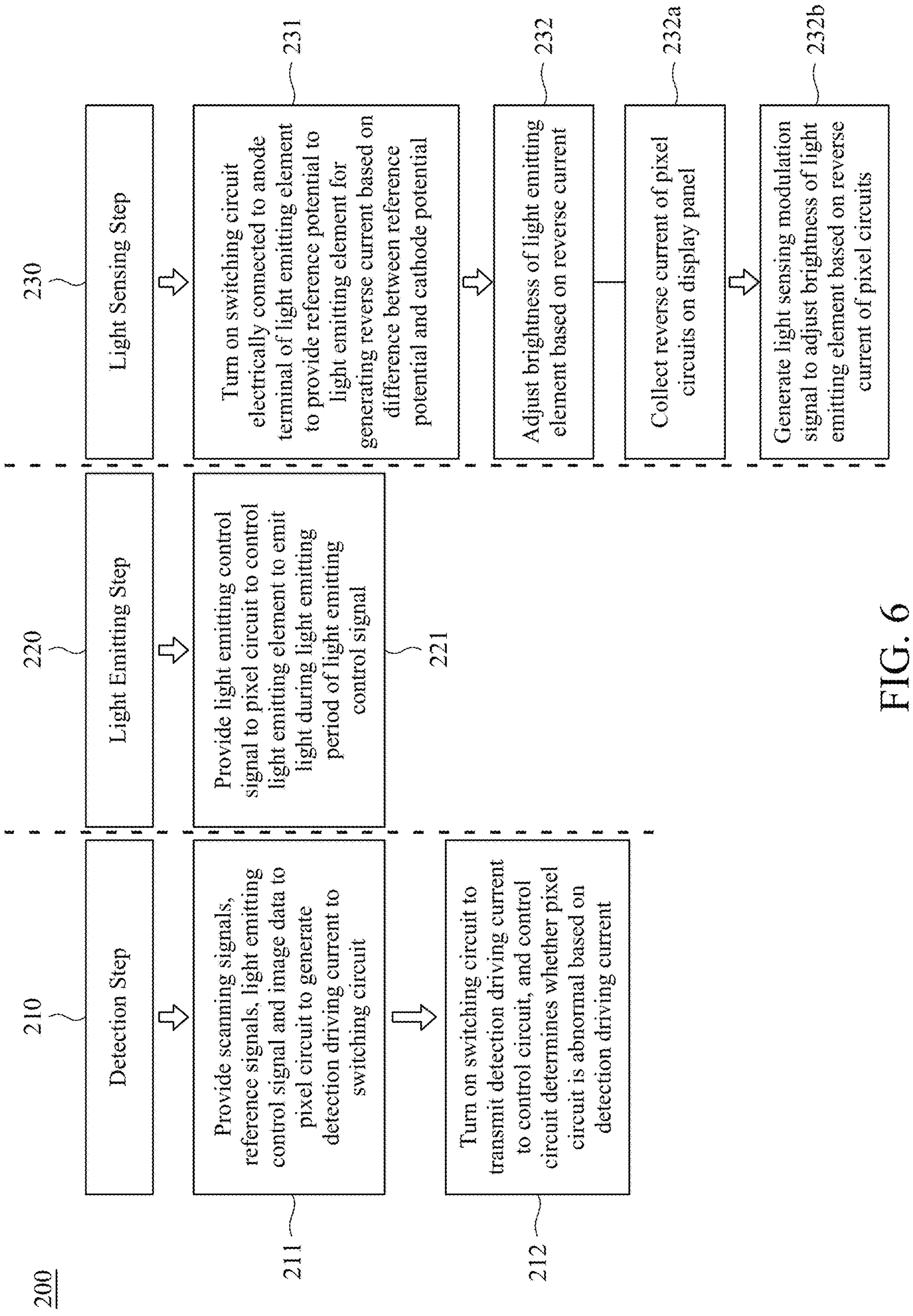
FIG. 6 is a flow diagram of a pixel circuit driving method according to embodiments of the present disclosure.

Referring to FIG. 6, FIG. 6 is a schematic diagram of a pixel circuit driving method 200 according to embodiments of the present disclosure. The pixel circuit driving method 200 is suitable for driving a pixel circuit having a light sensing function (such as the pixel circuit 110 shown in FIG. 2). The pixel circuit driving method 200 includes a detection step 210, a light emitting step 220, and a light sensing step 230.

Figure 7:
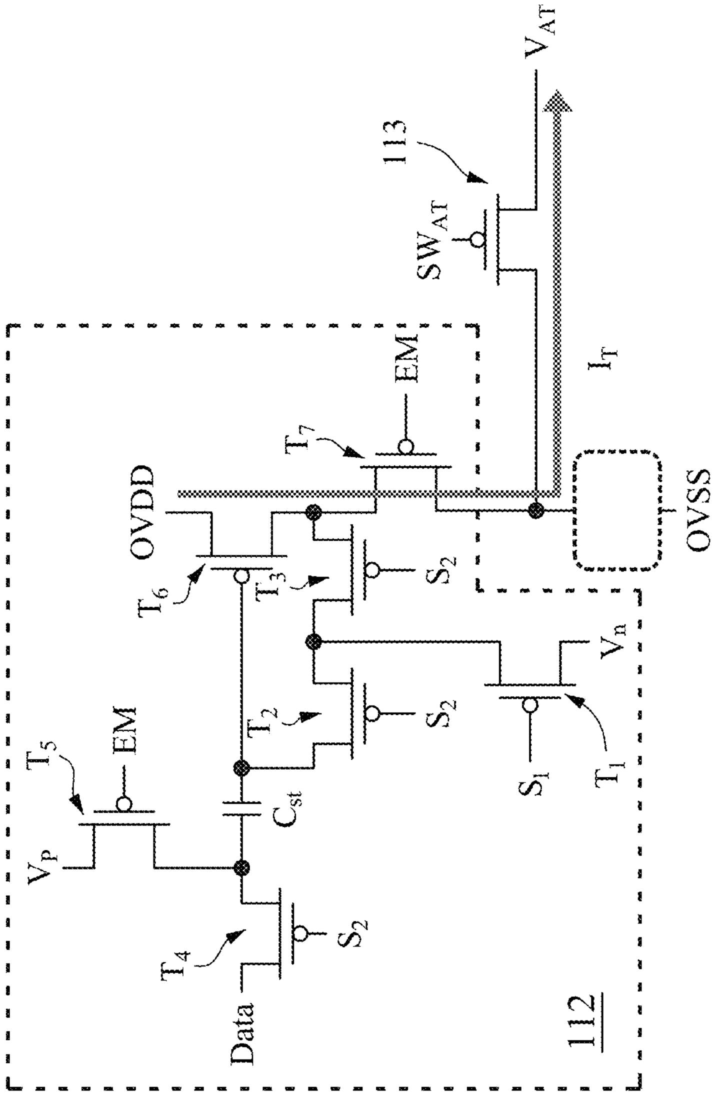
FIG. 7 is a schematic diagram of a pixel circuit during a detection step according to an embodiment of the present disclosure.

The detection step 210 includes Steps 211 and 212 and is performed before the light emitting element 111 is electrically connected to the pixel circuit 110. Specifically, as shown in FIG. 7, the switching circuit 113 can be used as an array detection circuit for detecting the pixel circuit 110 to ensure the proper functioning of the pixel circuit 110 (e.g., generating a correct detection driving current $I_T$ based on a provided detection signal) before the light emitting elements 111 (in the pixel circuits 110) are massively transferred to the target substrate.

In detection step 210, Step 211 is first performed to provide scanning signals (e.g., the scanning signals $S_1$, $S_2$ in FIG. 7), reference signals (e.g., the reference signals $V_n$, $V_p$, OVDD, OVSS in FIG. 7), a light emitting control signal (e.g., the light emitting control signal EM in FIG. 7) and an image data (e.g., the image data Data in FIG. 7) to the light emitting element driving circuit 112 of the pixel circuit 110 to generate the detection driving current $I_T$ to the switching circuit 113.

Then, Step 212 is performed to turn on the switching circuit 113 based on the control signal $SW_{AT}$ and transmit the detection driving current $I_T$ to the control circuit 140, so that the control circuit 140 determines whether the pixel circuit 110 is abnormal (e.g., determines whether the detection driving current $I_T$ exceeds a preset value) based on the detection driving current $I_T$. As a result, the detection step 210 is substantially complete. In some embodiments, the detection step 210 further includes detecting whether each storage capacitor $C_{st}$ and the transistor $T_1$~$T_7$ of the pixel circuit 110 is abnormal.

In the embodiment of the disclosure, the switching circuit 113 not only serves as an array detection circuit, but also can be controlled to perform the subsequent light emitting step 220 and the light sensing step 230. Therefore, the switching circuit 113 serving as the array detection circuit is not removed or left on the display panel 120 without being used for any purpose after the detection step 210.

Figure 8B:
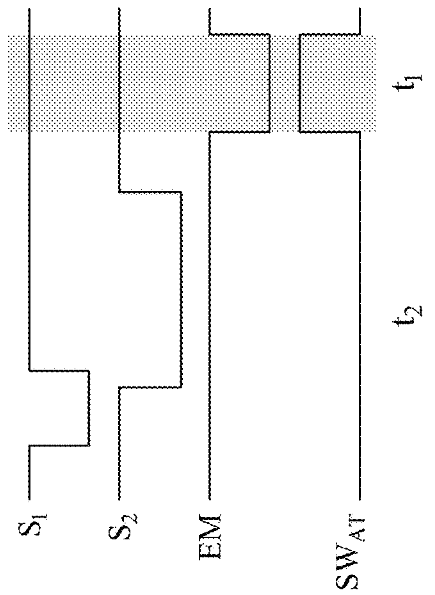
FIG. 8B is a timing diagram of the pixel circuit during the light emitting step according to an embodiment of the present disclosure.
Figure 8A:
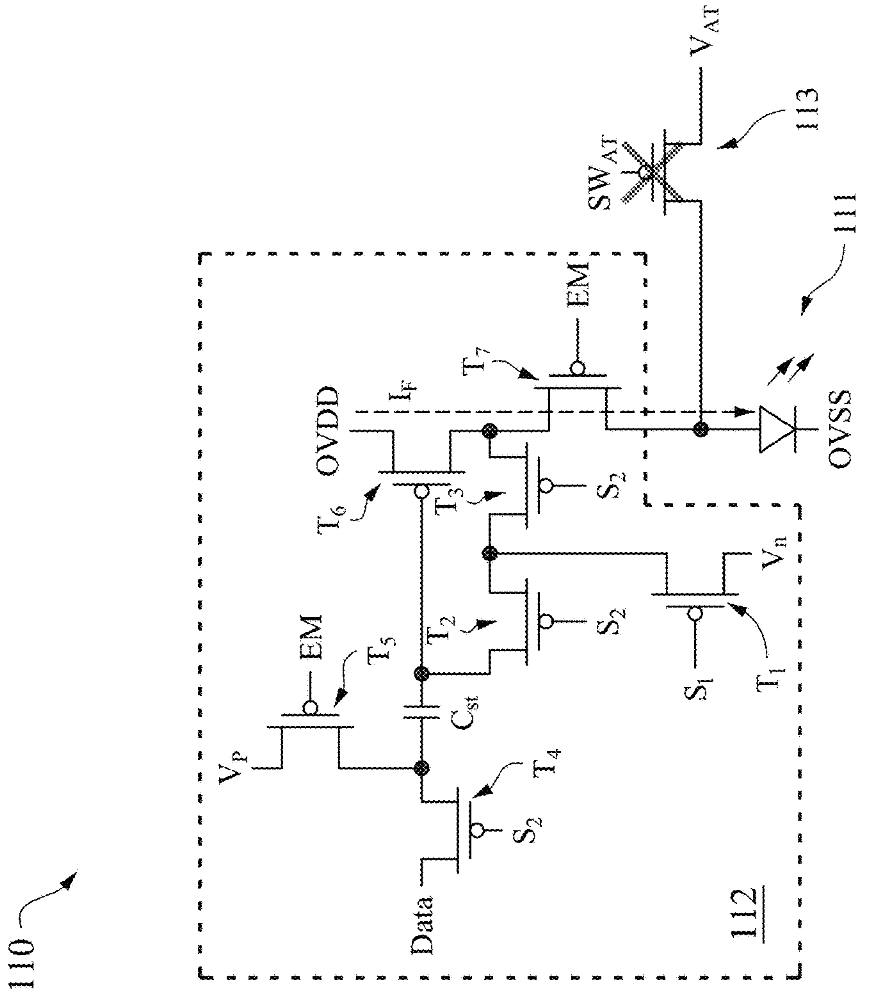
FIG. 8A is a schematic diagram of the pixel circuit during a light emitting step according to an embodiment of the present disclosure.

Referring back to FIG. 6, the light emitting step 220 includes Step 221 and is performed after the light emitting element 111 is electrically connected to the pixel circuit 110. As shown in the operation of the pixel circuit 110 and the corresponding timing diagram of FIGS. 8A and 8B, at Step 221, the transistors $T_5$ and $T_7$ in the light emitting element driving circuit 112 are turned on based on the low logic level of the light emitting control signal EM, causing the forward current $I_F$ to flow through the light emitting element 111, and the light emitting element 111 emits light based on the forward current $I_F$ during the light emitting period.

It should be noted that during the low logic level of the light emitting control signal EM (the light emitting period $t_1$), the switching circuit 113 is turned off due to the high logic level of the control signal $SW_{AT}$, i.e., light sensing is not performed. In addition, although the switching circuit 113 is illustrated as a P-type transistor and is turned on at a low logic level and turned off at a high logic level of the control signal $SW_{AT}$, in other embodiments, the switching circuit 113 is an N-type transistor and is turned on at a high logic level and turned off at a low logic level of the control signal $SW_{AT}$, and the present disclosure is not limited thereto. In yet other embodiments, the switching circuit 113 is an N-type transistor and the control signal $SW_{AT}$ is the light emitting control signal EM, so that light emitting can be performed during the low logic level of the light emitting control signal EM and light sensing can be performed during the high logic level of the light emitting control signal EM.

Figure 8D:
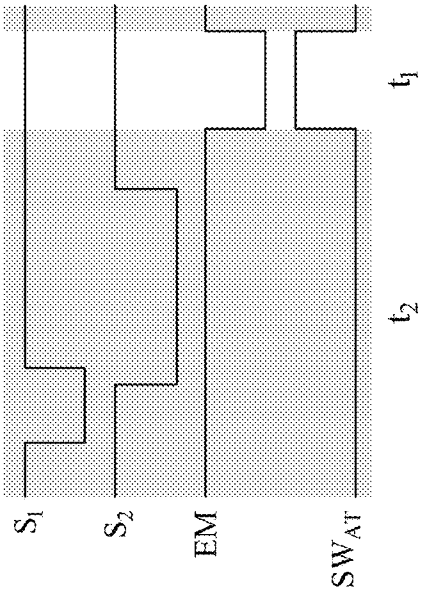
FIG. 8D is a timing diagram of the pixel circuit during the light sensing step according to an embodiment of the present disclosure.
Figure 8C:
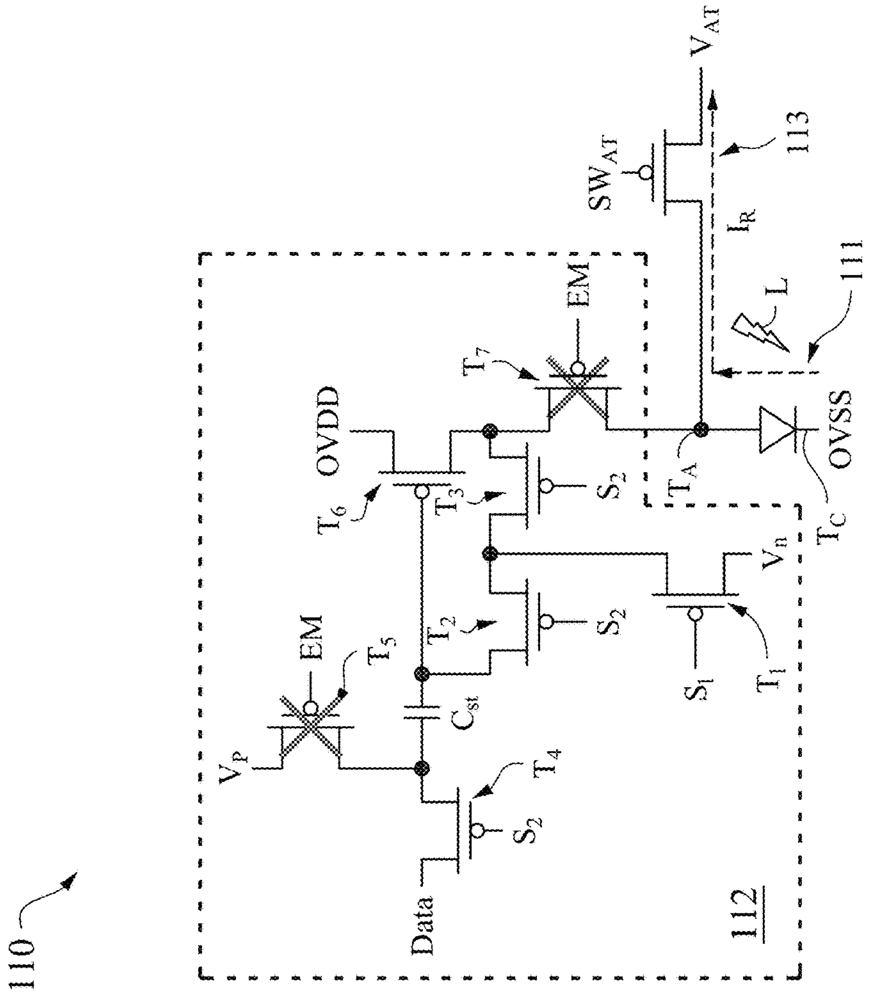
FIG. 8C is a schematic diagram of the pixel circuit during a light sensing step according to an embodiment of the present disclosure.

Referring back to FIG. 6, the light sensing step 230 includes Steps 231 and 232 and is performed after the light emitting element 111 is electrically connected to the pixel circuit 110. As shown in the operation of the pixel circuit 110 and the corresponding timing diagram of FIGS. 8C and 8D, at Step 231, the switching circuit 113 electrically connected to the anode terminal $T_A$ of the light emitting element 111 is first turned on to provide a reference potential $V_{AT}$ to the anode terminal $T_A$ of the light emitting element 111, so that the light emitting element 111 generates a reversed current $I_R$ based on the difference between the reference potential $V_{AT}$ and the cathode potential OVSS.

Then, Step 232 is performed to adjust the brightness of the light emitting element 111 based on the reverse current $I_R$. Specifically, when the reverse current $I_R$ is larger, which means that the ambient light L is stronger, and the brightness of the light emitting element 111 needs to be adjusted brighter by referring to the reverse current $I_R$. Conversely, when the reverse current $I_R$ is smaller, which means that the ambient light L is darker, and the brightness of the light emitting element 111 needs to be adjusted dimmer by referring to the reverse current $I_R$. As a result, the display device 100 having light sensing function realizes the function of adjusting the display brightness by light sensing.

In the embodiment of the present disclosure, the Step 232 of adjusting the light emitting element 111 based on the reverse current $I_R$ further includes Steps 232*a* and 232*b*. At Step 232*a*, the photocurrent collection circuit 130 may be used to collect the reverse currents $I_R$ of the pixel circuits 110 on the display panel 120, in which the amount of the reverse current $I_R$ collected depends on the number of the pixel circuits 110 used for light sensing. At Step 232*b*, the control circuit 140 generates a light sensing modulation signal Sm to the pixel circuits 110 based on the collected reverse current $I_R$ to adjust the brightness of the light emitting element 111 (in each pixel circuit 110).

Specifically, the control circuit 140 may calculate the current ambient light L based on the reverse current $I_R$ to further adjust a brightness of the light emitting element 111 to the desired target brightness. Based on the target brightness to be adjusted, the control circuit 140 generates the light sensing modulation signal SM to adjust the image data (Data) inputted to the pixel circuit 110, so that the light emitting element 111 may emit the target brightness during the light emitting period of the light emitting control signal EM. As a result, the display device 100 having the light sensing function realizes the function of adjusting the display brightness by light sensing.

According to the display device having the light sensing function and the pixel circuit driving method of the present disclosure, the switching circuit controls the voltage at both terminals of the light emitting element to be forward biased or reverse biased, so that the light emitting element emits light based on the forward current in the forward biased mode, and acts as a light sensor in the reverse bias mode. In the reverse bias mode, the light emitting element generates a reverse current that is proportional to the light intensity, and the control circuit deduces the current ambient light intensity based on the magnitude of the reverse current and further adjusts the brightness of the light emitting element. In summary, the present disclosure realizes the array detection function, the light emitting function and the light sensing function in a single pixel circuit, which effectively enhances the space utilization of the display device and also solves the problem that the ambient light may not be sensed by the ambient light sensor due to the black organic material used in the current applications.

Although the present disclosure has been disclosed as above in embodiments, the embodiments are not intended to limit the present disclosure, and those of ordinary skill in the art may make some changes and embellishments within the spirit and scope of the present disclosure, therefore, the scope of protection of the present disclosure shall be defined in the attached Claims.

What is claimed is:

1. A pixel circuit driving method for driving a first pixel circuit having a light sensing function, the first pixel circuit comprising a light emitting element and a switching circuit electrically connected to an anode terminal of the light emitting element, the pixel circuit driving method comprising:

performing a light emitting step, comprising:

providing a light emitting control signal for the first pixel circuit to control the light emitting element to emit light during a light emitting period of the light emitting control signal; and performing a light sensing step, comprising:

turning on the switching circuit electrically connected to the anode terminal of the light emitting element and providing a reference potential to the light emitting element through the switching circuit, wherein the reference potential is lower than a cathode potential of a cathode terminal of the light emitting element, and the light emitting element generates a reverse current proportional to light intensity based on a difference between the reference potential and the cathode potential; and adjusting a brightness of the light emitting element based on the reverse current;

wherein the first pixel circuit is disposed in a first row on a display panel, and a plurality of second pixel circuits of the display panel arranged in a plurality of rows different from the first row; and wherein adjusting the brightness of the light emitting element based on the reverse current comprises collecting the reverse current of the plurality of second pixel circuits and adjusting the brightness of the light emitting element based on the reverse current of the plurality of second pixel circuits.

2. The pixel circuit driving method according to claim 1, wherein a period during which the light sensing step is performed does not overlap with the light emitting period of the light emitting control signal.

3. The pixel circuit driving method according to claim 1, wherein before the light emitting element is electrically connected to the first pixel circuit, the pixel circuit driving method further comprises:

performing a detection step, comprising:

providing at least one scanning signal, at least one reference signal, the light emitting control signal, and an image data to the first pixel circuit for generating a detection driving current to the switching circuit; and turning on the switching circuit to transmit the detection driving current to a control circuit for determining whether the first pixel circuit is abnormal based on the detection driving current.

4. The pixel circuit driving method according to claim 3, wherein the first pixel circuit further comprises a light emitting element driving circuit, and the light emitting element driving circuit comprises at least one storage capacitor and a plurality of transistors, the detection step further comprises:

detecting whether each of the at least one storage capacitor and the transistors is abnormal.

5. The pixel circuit driving method according to claim 1, wherein the switching circuit comprises a P-type transistor.

6. The pixel circuit driving method according to claim 1, wherein the switching circuit comprises an N-type transistor.

7. A display device having a light sensing function comprising a plurality of pixel circuits, and each of the pixel circuits comprising:

a light emitting element having an anode terminal and a cathode terminal;

a light emitting element driving circuit electrically connected to the light emitting element for driving the light emitting element to emit light during a light emitting period of a light emitting control signal based on the light emitting control signal; and a switching circuit electrically connected between the anode terminal of the light emitting element and a reference potential, wherein the reference potential is lower than a cathode potential of the cathode terminal of the light emitting element;

wherein the light emitting element generates a reverse current proportional to light intensity based on a difference between the reference potential and the cathode potential in response to the switching circuit being turned on, and the light emitting element driving circuit adjusts a brightness emitted by the light emitting element based on the reverse current;

wherein the plurality of pixel circuits comprises a plurality of first pixel circuits and a plurality of second pixel circuits, the plurality of first pixel circuits are disposed in a first row on a display panel, and the plurality of second pixel circuits of the display panel arranged in a plurality of rows different from the first row; and wherein adjusting the brightness of the light emitting element based on the reverse current comprises collecting the reverse current of the plurality of second pixel circuits and adjusting the brightness of the light emitting element based on the reverse current of the plurality of second pixel circuits.

8. The display device according to claim 7, wherein the switching circuit comprises a P-type transistor.

9. The display device according to claim 7, wherein the switching circuit comprises an N-type transistor.

10. The display device according to claim 7, wherein an on period of the switching circuit does not overlap with the light emitting period of the light emitting control signal.

11. The display device according to claim 7, further comprising:

a photocurrent collection circuit electrically connected to the pixel circuits and configured to collect the reverse current sensed by each of the pixel circuits.

12. The display device according to claim 11, further comprising:

a control circuit electrically connected to the photocurrent collection circuit and configured to generate a light sensing modulation signal based on the reverse current sensed by the pixel circuits and adjust the brightness of the light emitting element based on the light sensing modulation signal.

13. The display device according to claim 7, wherein the switching circuit is further used as an array detection circuit for detecting corresponding one of the pixel circuits before the light emitting element is electrically connected to each of the pixel circuits.

14. The display device according to claim 7, wherein the light emitting element driving circuit comprises at least one storage capacitor and a plurality of transistors.

* * * * *